United States Patent [19]
Williams

[11] Patent Number: 5,150,911
[45] Date of Patent: * Sep. 29, 1992

[54] TOW BAR ASSEMBLY

[76] Inventor: Gregory J. Williams, 523½ E. Sixth St., Reno, Nev. 89512

[*] Notice: The portion of the term of this patent subsequent to Sep. 25, 2007 has been disclaimed.

[21] Appl. No.: 588,066

[22] Filed: Sep. 24, 1990

Related U.S. Application Data

[63] Continuation-in-part of Ser. No. 248,738, Sep. 23, 1988, Pat. No. 4,958,847.

[51] Int. Cl.$^5$ .............................................. B60D 1/167
[52] U.S. Cl. .................................. 280/502; 280/491.1; 280/491.5; 280/507; 280/511
[58] Field of Search ............... 280/504, 511, 493, 494, 280/502

[56] References Cited

U.S. PATENT DOCUMENTS

| | | | |
|---|---|---|---|
| 2,521,132 | 9/1950 | Smith | 280/511 |
| 2,522,793 | 9/1950 | Koeckritz | 280/491.5 |
| 2,552,885 | 5/1951 | Claud-Mantle | 280/493 |
| 2,693,369 | 11/1954 | Gross | 280/502 |
| 3,113,789 | 12/1963 | Safford | 280/502 |
| 3,119,631 | 1/1964 | Wanamaker | 280/446 |
| 3,178,204 | 4/1965 | Croft | 280/502 |
| 3,302,958 | 2/1967 | Fawcett et al. | 280/481 |
| 3,472,529 | 10/1969 | Gal | 280/502 |
| 3,481,630 | 12/1969 | Parkhurst | 280/502 |
| 3,481,631 | 12/1969 | Parkhurst | 280/502 |
| 3,492,022 | 1/1970 | Hansen | 280/491.5 |
| 3,547,470 | 12/1970 | Parkhurst | 280/502 |
| 3,781,038 | 12/1973 | Bachel et al. | 280/491.4 |
| 3,794,356 | 2/1974 | Hollis, Jr. | 280/494 |
| 3,806,162 | 4/1974 | Milner | 280/502 |
| 4,022,489 | 5/1977 | Shattles et al. | 280/502 |
| 4,060,331 | 11/1977 | Domer et al. | 280/511 |
| 4,196,919 | 4/1980 | Tomen | 280/502 |
| 4,266,800 | 5/1981 | Hawkins | 280/480 |
| 4,374,593 | 2/1983 | Smith et al. | 280/491.5 |
| 4,778,196 | 10/1988 | Spoliansky | |
| 4,958,847 | 9/1990 | Williams | 280/502 |
| 4,993,739 | 2/1991 | Putnam | 280/511 |

FOREIGN PATENT DOCUMENTS

| | | | |
|---|---|---|---|
| 231903 | 8/1959 | Australia | |
| 2060517 | 5/1973 | Fed. Rep. of Germany | |
| 2360489 | 6/1975 | Fed. Rep. of Germany | |
| 722441 | 12/1931 | France | 280/511 |
| 731500 | 5/1932 | France | 280/511 |
| 1487736 | 10/1977 | United Kingdom | 280/511 |

Primary Examiner—Mitchell J. Hill
Attorney, Agent, or Firm—Poms, Smith, Lande & Rose

[57] ABSTRACT

An improved tow bar assembly used to tow cars or trailers located on uneven terrain. The assembly uses two tow bars. One end of each tow bar is attached to a bumper housing. Each bumper housing is removably clamped to the bumper of a disabled vehicle by a chain which has one end secured to the undercarriage of the vehicle and the other end engaged to a chain hook member. The chain is pulled tight by tightening wing nuts threaded onto the upper end of a bolt which causes a spring located between the wing nuts and the top of the bumper housing to pull the chain tight. A socket member located where the other ends of the tow bars join together engages a ball member mounted on a supporting structure of a tow vehicle providing a universal-type joint. The socket member is secured to the ball member by a rotating latch member which uses a pin to prevent the latch member from rotating relative to the socket member, effectively locking the socket member to the ball member. The socket member and rotating latch member have arcuate-shaped depressions or cutaway surfaces therein which facilitate rotation of the socket member with respect to the ball member.

13 Claims, 8 Drawing Sheets

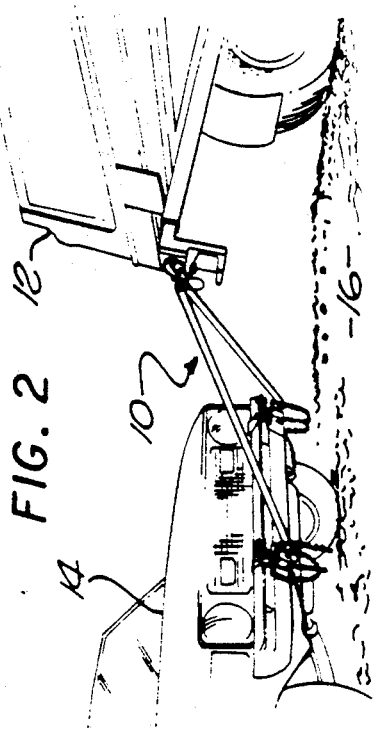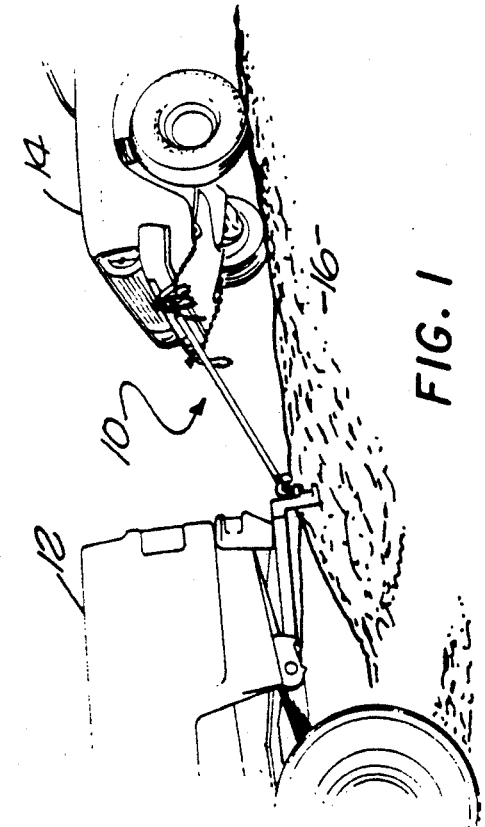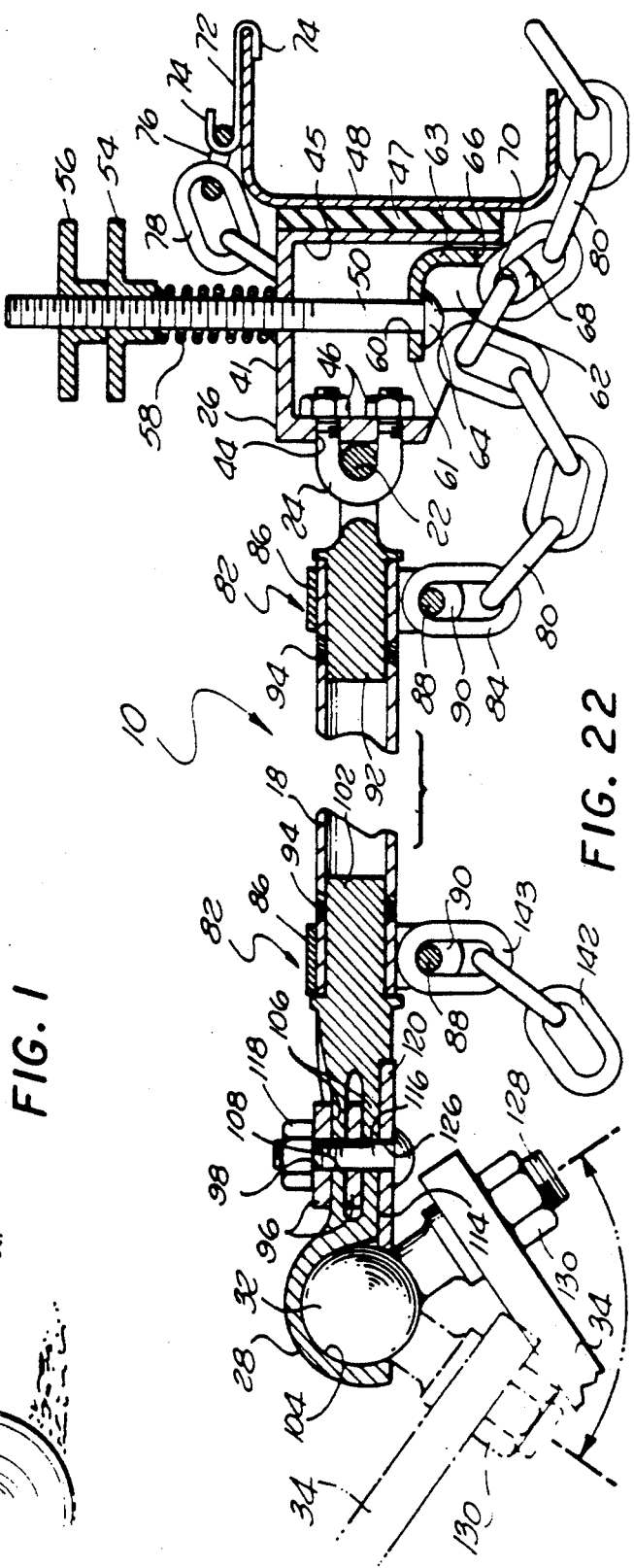

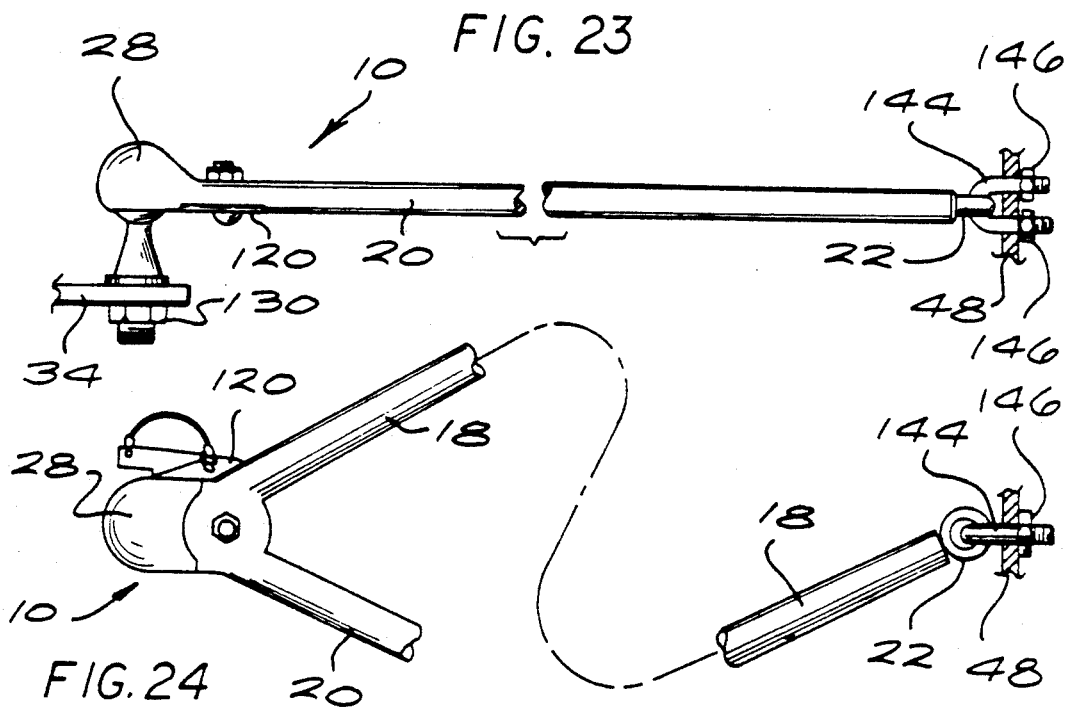
FIG. 23
FIG. 24
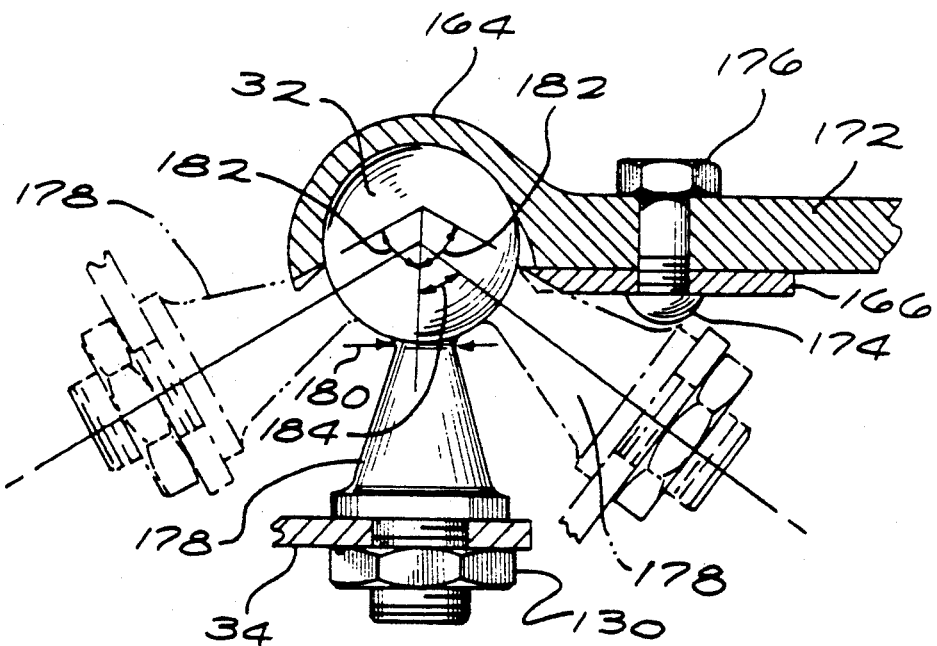
FIG. 25

TOW BAR ASSEMBLY

CROSS-REFERENCE TO RELATED APPLICATION

This application is a continuation in part of application, Ser. No. 07/248,738, filed Sep. 23, 1988, and entitled "Tow Bar Assembly" issued as U.S. Pat. No. 4,958,847 on Sep. 25, 1990.

BACKGROUND OF THE INVENTION

The present invention relates generally to tow bar assemblies and, more particularly, to a rugged tow bar assembly capable of operating with extreme differences in height between towed and towing vehicles featuring a socket member and a rotating latch member having arcuate-shaped depressions or cutaway surfaces therein which facilitate rotation of the socket member with respect to a corresponding ball member of a universal-type joint.

A variety of different tow bar assemblies have been used in the past for the purpose of towing disabled vehicles. Such tow bar assemblies are shown, for example, in U.S. Pat. Nos. 4,374,593, issued to Smith, et al. on Feb. 22, 1983; 4,266,800, issued to Hawkins on May 12, 1981; 4,022,489 issued to Shattles, et al., on May 10, 1977; 3,806,162, issued to Milner on Apr. 23, 1974; 3,472,529, issued to Gal on Oct. 14, 1969; 3,492,022, issued to Hansen on Jan. 27, 1970; and 3,119,631, issued to Wanamaker on Jan. 28, 1964. However, these tow bar assemblies are either too bulky, complicated and expensive using too many parts, or difficult to use when the vehicle to be towed is located on uneven terrain such as in a ditch, etc. Trailer hitch assemblies are disclosed in U.S. Pat. Nos 4,196,919, issued to Tomen on Apr. 8, 1980; 3,547,470, issued to Parkhurst on Dec. 15, 1970; 3,481,630 and 3,481,631, issued to Parkhurst on Dec. 2, 1969; 3,178,204, issued to Croft on Apr. 13, 1965; 2,693,369, issued to Gross on Nov. 2, 1954; 2,522,793, issued to Koeckritz on Sep. 19, 1950; and 2,521,132, issued to Smith on Sep. 5, 1950. A bumper hitch assembly is described in U.S. Pat. No. 3,113,789, issued to Safford on Dec. 10, 1963. A tow bar assembly for towing disabled snowmobiles is disclosed in U.S. Pat. No. 3,781,038, issued to Bachel, et al., on Dec. 25, 1973. Finally, a bumper attachment used for parking a vehicle is disclosed in U.S. Pat. No. 3,302,958, issued to Fawcett, et al. on Feb. 7, 1967.

SUMMARY OF THE INVENTION

None of the above patents discloses a tow bar assembly that is relatively inexpensive to manufacture and easy to use when a vehicle to be towed is located on uneven terrain.

It is an object of this invention to provide an improved tow bar assembly

It is another object of this invention to provide a tow bar assembly which is economical to manufacture, that can be used on a variety of different vehicles.

It is still another object of this invention to provide a tow bar assembly that may be used to tow a vehicle located on uneven terrain when the vehicle is located above or below a tow vehicle.

It is still another object of this invention to provide a tow bar assembly that uses a universal ball-socket connection at the support structure of a tow truck that may be easily connected and disconnected and which facilitates towing on extremely uneven terrain It is still another object of this invention to provide a tow bar assembly which may be easily connected and disconnected to the bumper of a vehicle to be towed.

It is still another object of this invention to provide a tow bar assembly which may be used to tow a trailer.

It is still another object of this invention to provide a two bar assembly which may have part of the assembly permanently attached to the vehicle or trailer being towed.

These and other objects and advantages are attained by an improved tow bar assembly used to tow cars located on uneven terrain The assembly uses two pivotally coupled tow bars. One end of each tow bar is attached to a bumper housing A first chain attached to a clip engaged to the bumper is used to position the bumper housing on the bumper of a disabled vehicle. After the housing is positioned, it is removably clamped to the bumper by a second chain which has one end secured to the undercarriage of the vehicle and the other end engaged to a chain hook member. The second chain is pulled tight by tightening wing nuts threaded onto the upper end of a bolt engaging the bumper housing which causes a spring located between the wing nuts and the top of the housing to pull the chain tight.

A socket member located where the other ends of the tow bars are pivotally joined together engages a ball member mounted on a supporting structure of a tow vehicle providing a universal-type joint allowing the socket member to rotate with respect to the ball member. The socket member is secured to the ball member by a rotating latch member which uses a pin to prevent the latch member from rotating relative to the socket member, effectively locking the socket member to the ball member. The socket member and rotating latch member have arcuate-shaped depressions or cutaway surfaces therein which facilitate rotation of the socket member with respect to the ball member.

If desired, the ends of the tow bars may be welded, bolted or otherwise attached to the bumper of a vehicle or to a trailer. As such, part of the tow bar assembly may be removably or permanently attached to a towed vehicle or trailer.

The various features of the present invention will be best understood together with further objects and advantages by reference to the following description of the preferred embodiment taken in conjunction with the accompanying drawings.

BRIEF DESCRIPTION OF THE DRAWINGS

FIG. 1 is a perspective view of a tow bar assembly illustrating the principles of the present invention showing how the assembly may be used to tow a vehicle located on terrain above a tow vehicle;

FIG. 2 is a perspective view of the tow bar assembly of FIG. 1 showing how the assembly may be used to tow a vehicle located on terrain below a tow vehicle;

FIG. 22 is a partial cross-sectional view of the socket member, rotating latch member, one of the tow bars and one of the bumper housings, illustrating how the housing is connected to a bumper and how the socket member rotatably engages the ball member providing a universal-type joint;

FIG. 23 is a side elevational view of another embodiment of the tow bar assembly showing how the ends of the tow bars may be connected to a bumper by eye fasteners and V-bolts;

FIG. 24 is a top plan view of the tow bar assembly of FIG. 23 with portions of the tow bars broken away showing an end of one of the tow bars connected to the bumper.

FIG. 25 is a partial cross-sectional view of the socket member, rotating latch member, and one of the tow bars, illustrating by dashed lines how arcuate-shaped depressions in the socket member and latch member facilitate rotation of the socket member with respect to the ball member;

DESCRIPTION OF THE PREFERRED EMBODIMENTS

Figure 3:
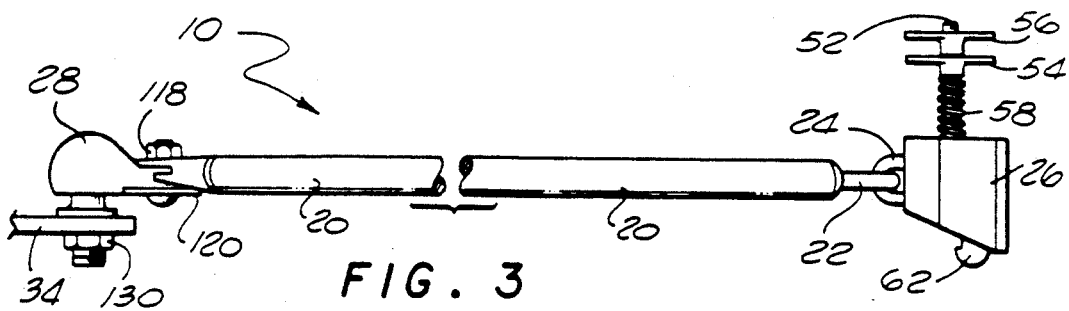
FIG. 3 is a side elevational view of the tow bar assembly of FIG. 1.

The following specification taken in conjunction with the drawings sets forth the preferred embodiments of the present invention in such a manner that any person skilled in the art can make and use the invention. The embodiments of the invention disclosed herein are the best modes contemplated by the inventor for carrying out his invention in a commercial environment although it should be understood that various modifications can be accomplished within the parameters of the present invention.

FIGS. 1 and 2 show the tow bar assembly 10 of the present invention being used by a tow vehicle or truck 12 to tow a disabled vehicle 14. Note that the tow bar assembly 10 may be used to tow a vehicle 14 located on uneven terrain 16 above or below the tow truck or other towing vehicle 12.

Figure 4:
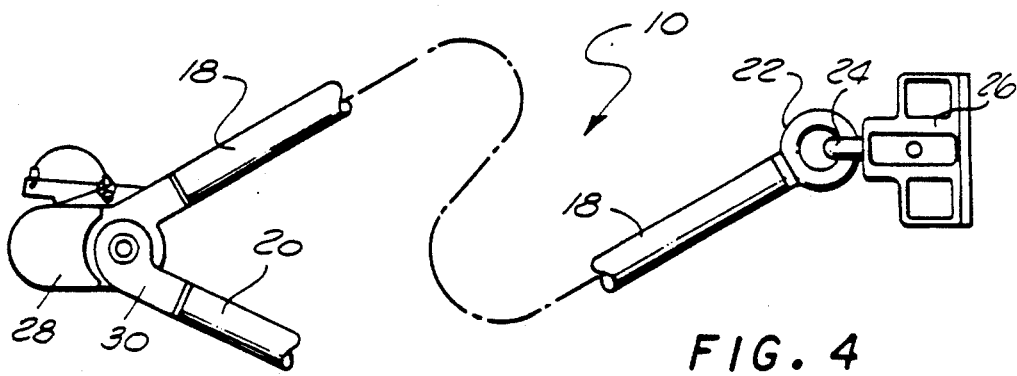
FIG. 4 is a top plan view of the tow bar assembly of FIG. 1 with portions of the two tow bars broken away showing an end of one of the two tow bars connected to a bumper housing by an eye bolt engaged to a U-bolt attached to the housing.

Referring now to FIGS. 3 and 4, the tow bar assembly 10 uses two tow bars 18 and 20 orientated in a general V-shaped configuration as shown in FIGS. 2 and 4. Each of the tow bars 18 and 20 has an eye fastener 22 attached to one end thereof. The eye fasteners 22 are used to engage the ends of the bars 18 and 20 to U-bolts 24 attached to two bumper housings 26 which are used to engage the tow bar assembly 10 to a disabled vehicle 14. The eye fasteners 22 are free to rotate with respect to the U-bolts 24. The other ends of the tow bars 18 and 20 are attached to a socket member 28 and clevis member 30, respectively, with the socket member 28 rotatably engaging a ball member 32 attached to a supporting structure 34 of the tow vehicle 12 in order to provide a universal-type joint, as explained in the following discussion.

Figures 5, 6, 7:
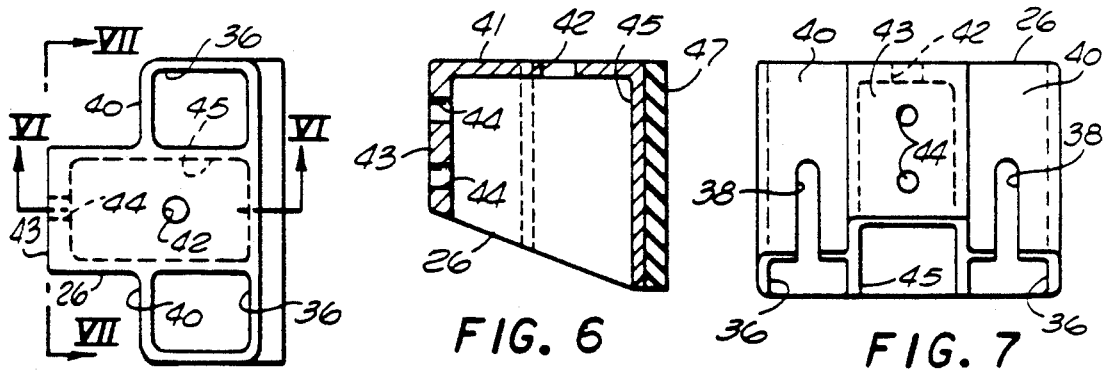
FIG. 5 is a top plan view of one of the bumper housings used for the assembly.
FIG. 6 is a cross-sectional view taken in the direction of arrows VI—VI shown in FIG. 5.
FIG. 7 is a front elevational view of the bumper housing taken in the direction of arrows VII—VII shown in FIG. 5.

FIGS. 5 through 7 show one of the bumper housings 26 used to removably engage the tow bar assembly 10 to the disabled vehicle 14. Each housing 26 has two cavities or apertures 36 passing therethrough from the top to the bottom thereof as shown in FIGS. 5 and 7. In addition, slotted grooves 38 exist in a corresponding wall 40 adjacent each cavity 36 of the housing 26 extending part of the way upward from the bottoms of the cavities 36 as shown in FIG. 7. The central portion of the housing 26 is hollow, having a central cavity 45. An aperture 42 passes through the top wall portion 41 of the housing 26 and two apertures 44 pass through the front wall portion 43 of the housing 26. A resilient pad 47, preferably made out of rubber or the like, is attached to the back of the housing bushing 26 using any convenient method such as adhesive or the like.

The U-bolts 24 engage apertures 44 in the bumper housings 26 and are secured to the housings 26 by nuts 46 as shown in FIG. 22. The eye fasteners 22 (see FIGS. 3, 4, 10 and 22) attached to the ends of the tow bars 18 and 20 engage the U-bolts 24 attaching the bars to the bumper housings 26.

Figure 18:
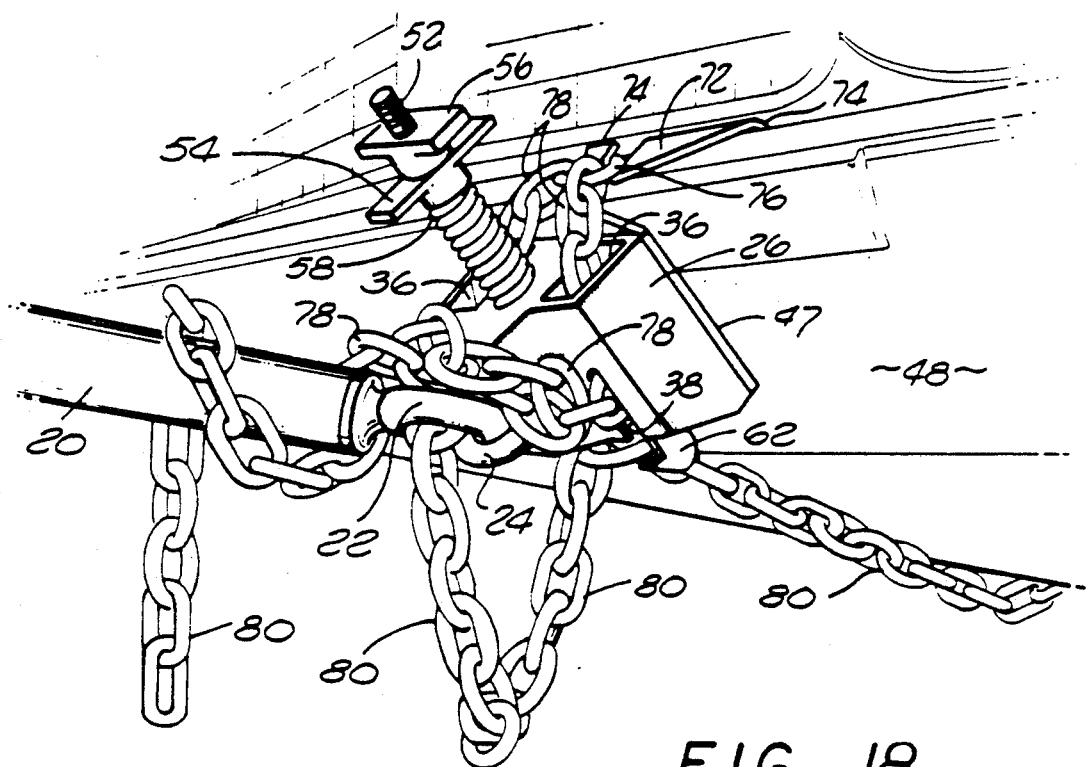
FIG. 18 is a perspective view showing how the bumper housing may be removably connected by chains to the bumper of a vehicle to be towed.

Referring now to FIGS. 18 and 22, the bumper housings 26 are used to removably engage the tow bar assembly 10 to the bumper 48 of a disabled vehicle 14. In order to accomplish this, each housing 26 has an elongated bolt 50 which slidably engages aperture 42 in the top wall 41 of the housing 26. A threaded portion 52 of the bolt 50 extends upward from wall 41. Two wing nuts 54 and 56 engage the threaded portion 52 as shown in FIG. 22 such that a spring 58 is trapped between the bottom of wing nut 54 and the top of wall 41. However, both 50 may be used without spring 58 if desired. The bottom end of bolt 50 passes into cavity 45 of housing 26 engaging an aperture 60 in a lug 61 of a chain hook member 62 (see FIGS. 11 through 13) and has a head 60 at the bottom end thereof which bears against the bottom of lug 61 causing member 62 to move upward with bolt 50.

Figure 12:
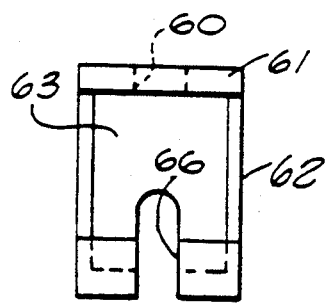
FIG. 12 is a front elevational view of the chain hook member of FIG. 11.
Figure 11:
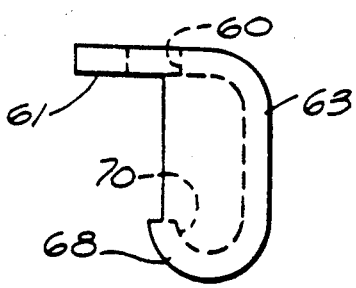
FIG. 11 is a side elevational view of one of the chain hook members used with the bumper housing.
Figure 13:
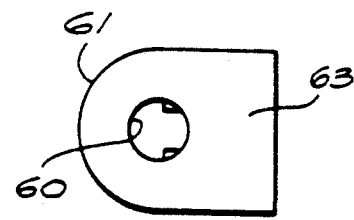
FIG. 13 is a top plan view of the chain hook member of FIG. 11.
Figure 14:
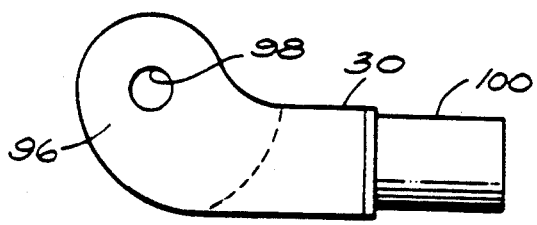
FIG. 14 is a top plan view of a clevis member attached to the end of one of the tow bars.
Figure 15:
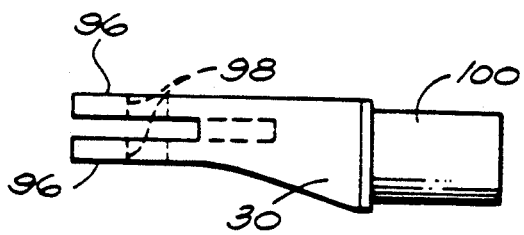
FIG. 15 is a side elevational view of the clevis member of FIG. 14.
Figure 16:
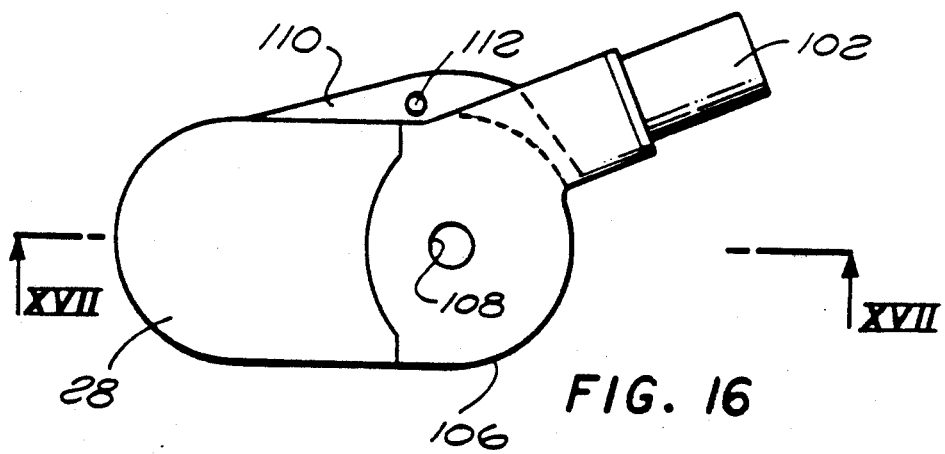
FIG. 16 is a top plan view of a socket member attached to the end of the other tow bar.
Figure 17:
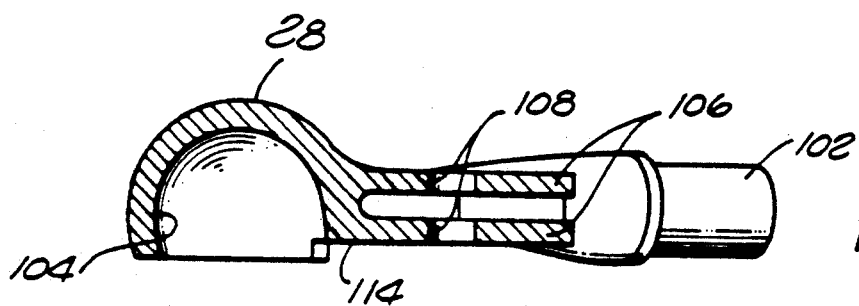
FIG. 17 is a cross-sectional view taken in the direction of arrows XVII—XVII shown in FIG. 16.

FIGS. 11 through 13 show one of the chain hook members 62. The chain hook member 62 has a curved portion 68 at the bottom thereof with a concave surface 70 and a slotted groove 66 passing through portion 68 and extending part of the way up vertical portion 63 of member 62.

Figure 8:
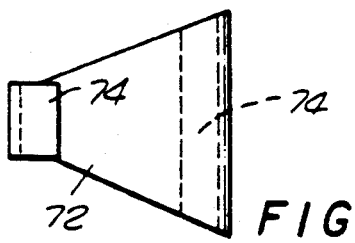
FIG. 8 is a top plan view of a bumper clip.
Figure 9:
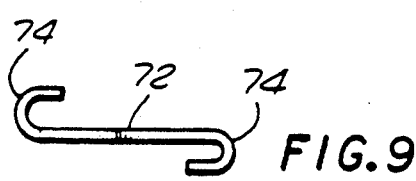
FIG. 9 is a side elevational view of the bumper clip of FIG. 8.
Figure 10:
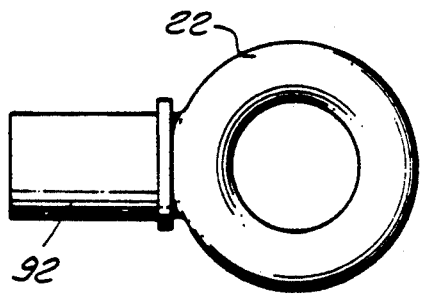
FIG. 10 is a detailed view of one of the eye fasteners used for the tow bars.

A bumper clip 72 shown in FIGS. 8 and 9 is also used with each bumper housing 26. The bumper clip 72 has curved engaging portions 74. Each bumper housing 26 is removably connected to the bumper 48 of a vehicle 14 by first engaging one of the portions 74 of one of the clips 72 to the bumper 48 as shown in FIGS. 18 and 22 and then engaging the other portion 74 of the slip 72 to a link 76 of a length of chain 78. As best shown in FIG. 18, the ends of the length of chain 78 are used with the tow rod assembly 10 so that they pass down cavities 36 in housing 26 and engage slotted grooves 38 of the housing 26 in such a way that bumper clip 72 and the engagement of chain 78 with grooves 38 offer sufficient support for the bumper housing 26 in order to allow the housing 26 to hang on the vehicle bumper 48 prior to clamping of the housing 26 to the bumper 48.

After each bumper housing 26 is positioned on the bumper 48 by clip 72 and length of chain 78, another length of chain 80 is used to clamp or secure the housing 26 to the bumper 48. This is accomplished by first securing one end of the length of chain 80 to the undercarriage or other lower supporting structure of the vehicle 14 to be towed (see FIGS. 1 and 2), and then engaging the chain 80 to curved portion 68 and concave surface 70 of the chain hook member 62 so that chain 80 also engages slotted groove 66 in member 62 as shown in FIGS. 18 and 22. Wing nut 54 is then tightened (screwed) compressing spring 58 which forces (biases) head 64 against the bottom of lug 61 causing chain hook member 62 to move upward inside cavity 45, thus causing chain 80 engaged to member 62 to tighten, resulting in bumper housing 26 being clamped or engaged to bumper 48. Note that pad 47 cushions the bumper housing 26 as it is clamped to the bumper 48. In addition, wing nut 56 may be tightened so that it functions as a lock nut helping to prevent nut 54 from coming loose.

Note that FIG. 18 shows the loose end of chain 80 draped over tow bar 20. Preferably, a clamp 82 is secured to bar 20 which would allow the end link 84 of chain 80 to be removably connected to the clamp 82 which adds backup support in case the chain 80 slips loose during towing operations. In such a case, the chain 80 would remain connected to clamp 82 or the tow bar 20 preventing the tow bar assembly 10 from disconnecting from the towed vehicle 14. Any type of fastening device may be used for clamp 82 which will allow chain 80 to be easily connected and disconnected from the clamp 82 such as a sleeve 86 that fits around bar 18 as shown in FIG. 22 having a bolt 88 that may be fastened and loosened to removably clamp two lugs 90 together in order to connect link 84 to bar 18. However, the tow bar assembly 10 may be used without such a clamp 82 if desired.

The tow bar assembly 10 may be disconnected from the bumper 48 by simply loosening wing nuts 54 and 56 of each bumper housing 26 allowing springs 58 to expand and chain hook members 62 to lower loosening the chains 80 so that the housings 26 are no longer clamped to the bumper 48. Chains 78 may then be slid out of slotted grooves 38 in the bumper housings 26 allowing the chains 78 to be loosened and the bumper clips 72 to be removed from the bumper 48.

If a person is unable to engage bumper clip 72 to the bumper 48, for example, because the bumper is a round pipe-like bumper, chain 78 may still be used with the bumper 48. This is accomplished by looping chain 78 around the back of the bumper 48 so that link 76 is engaged to chain hook member 62. Chain 80 is then engaged to member 62 and the undercarriage thereby holding housing 26 to the bumper 48. Housing 26 may also be attached to the undercarriage of the disabled vehicle 14 using chains 78 and 80. When housing 26 is attached to the undercarriage, chain 78 is looped around a supporting member under the vehicle 14 and link 76 is engaged to hook member 62 in the same way that the link 76 is engaged when chain 78 is lopped around the back of bumper 48. Chain 80 may then be engaged to hook member 62 and some part of the undercarriage thereby securing housing 26 to the undercarriage.

The housing 26 may also be attached to the bumper 48 or undercarriage of the vehicle 14 without using clip 72 by passing chain 80 through chain 78 (such or through link 76) and then looping chain 80 around the back of bumper 48 or around a supporting member under the vehicle 14 so that one end of chain 80 is secured to the undercarriage and the opposite end is engaged to hook member 62. Thus, housing 26 may be used with or without bumper clip 72 and may be secured to either the bumper 48 or the undercarriage of the disabled vehicle 14.

It is important to note that the ends of tow bars 18 and 20 have identical eye fasteners 22 that attach the bars to identical bumper housings 26. This is best shown in FIGS. 1 and 2. Also, the tow bars 18 and 20 are preferably made out of pipe and the eye fasteners 22 are preferably connected to the bars 18 and 20 by cylindrical members 92 which fit inside the bars 18 and 20 and are plug welded 94 to the bars (see FIGS. 10 and 22). However, any other suitable means of connecting cylindrical members 92 to tow bars 18 and 20 may be used. For example, cylindrical members 92 and bars 18 and 20 may have apertures passing there through that would allow nuts and bolts 94 (not shown) to be used to connect these parts together. If nuts and bolts are used, the tow bars 18 and 20 may be unbolted from the cylindrical members 92 and replaced by other bars.

Turning now to FIGS. 14 through 17 and 19, the other ends of the tow bars 18 and 20 are connected to socket member 28 and clevis member 30, respectively. The clevis member 30 has two forked members 96, apertures 98 passing through the members 96 and a cylindrical member 100 attached thereto. The clevis member 30 may be attached to the tow bar 20 by a plug weld or nuts and bolts similar to how cylindrical members 92 may be attached to bars 18 and 20. Socket member 28 also has a cylindrical member 102 which may be used to connect it to tow bar 18 in a similar manner. Nuts and bolts (not shown) may be used to attach the tow bars 18 and 20 to the cylindrical members 100 and 102 which allow the tow bars to be unbolted from the cylindrical members and replaced by other bars.

Socket member 28 connected to tow bar 18 has a socket cavity 104 near the end thereof, two forked members 106 with apertures 108 passing therethrough and an extension 110 with an aperture 112 passing therethrough. Extension 110 is preferably flat and in alignment with or in the same plane as the bottom 114 of lower forked member 106.

Figure 19:
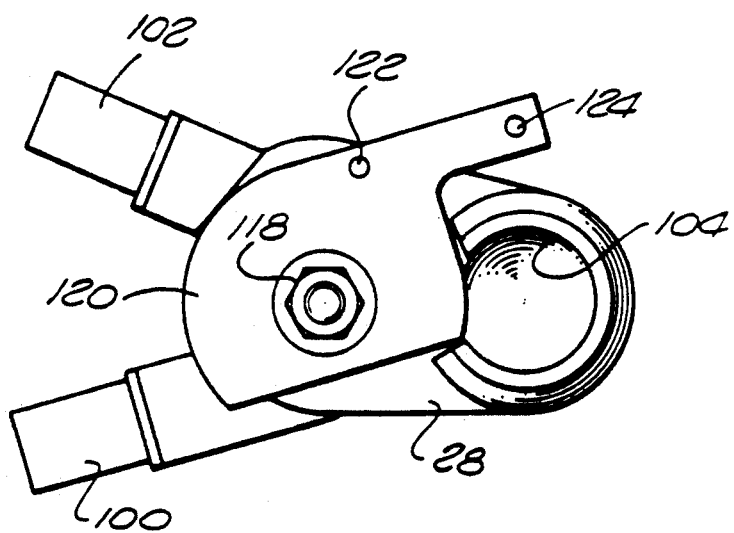
FIG. 19 is a bottom plan view of the clevis member of FIG. 15, socket member of FIG. 16 and a rotatable latch member with the members held together by a bolt and nut (see FIG. 22)
Figure 20:
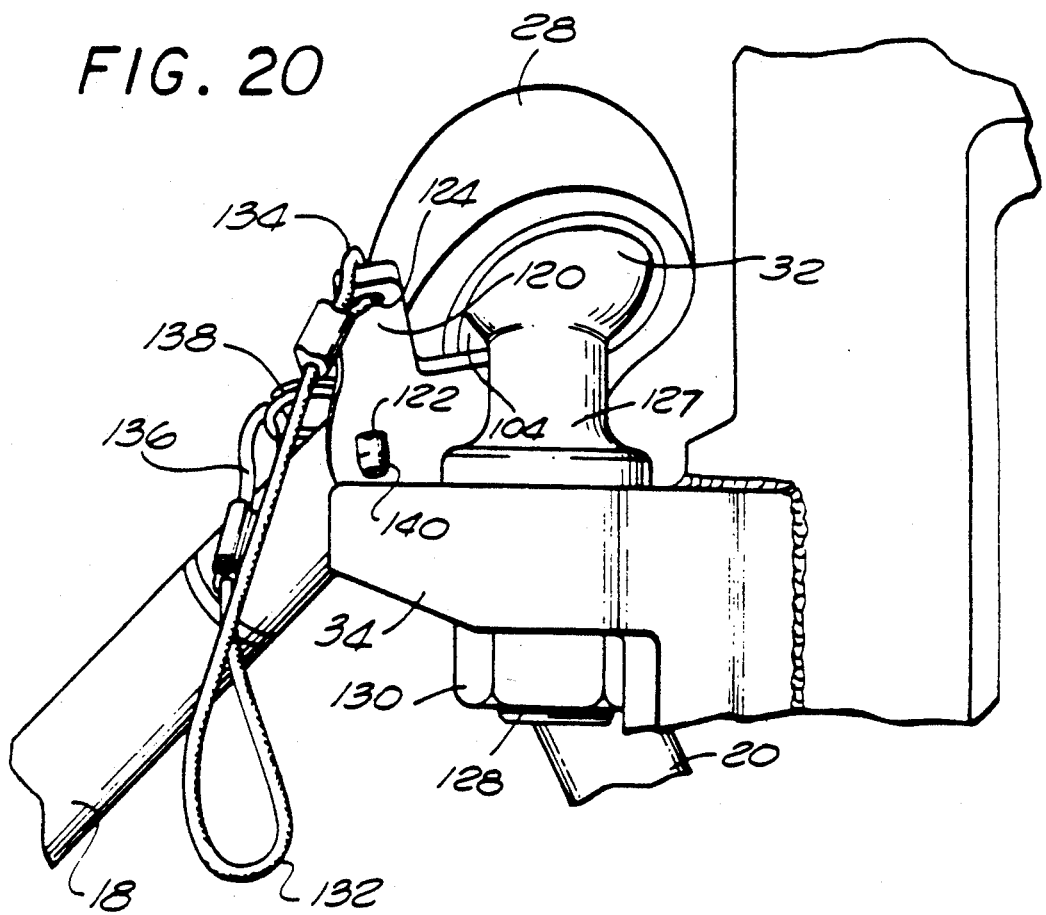
FIG. 20 is a perspective view showing how the rotatable latch member is used with a locking pin to removably engage the socket member to a ball member attached to the supporting structure of a tow vehicle.

Referring now to FIGS. 19 and 22, the ends of tow bars 18 and 20 are preferably held together by a bolt 116 and nut 118 when forked members 96 of clevis member 30 are engaged to the forked members 106 of socket member 28. Bolt 116 passes through apertures 98 and 108 in forked members 96 and 106, respectively. Note that the nut 118 may be located on the top of the joint (see FIG. 22) or at the bottom of the joint (see FIG. 21) as desired. Also held to the bottom 114 of forked member 106 by bolt 116 and nut 118 is a rotatable latch member 120 having apertures 122, 124 and 126 passing therethrough. Preferably, latch member 120 is a plate-like member as shown in FIGS. 19, 20 and 22. Bolt 116 passes through aperture 126 in latch member 120 and nut 118 is tightened in such a way to allow member 120 to be manually or frictionally rotated to allow aperture 122 in member 120 to be aligned with aperture 112 in socket member 28. As such, tow bars 18 and 20 are pivotally joined together by bolt 116. Since tow bars 18 and 20 are pivotally joined together, the bars may be conveniently rotated toward each other after removal from truck 12 and vehicle 12 and folded together to facilitate storage, transportation or handling of the tow bar assembly 10.

Figure 21:
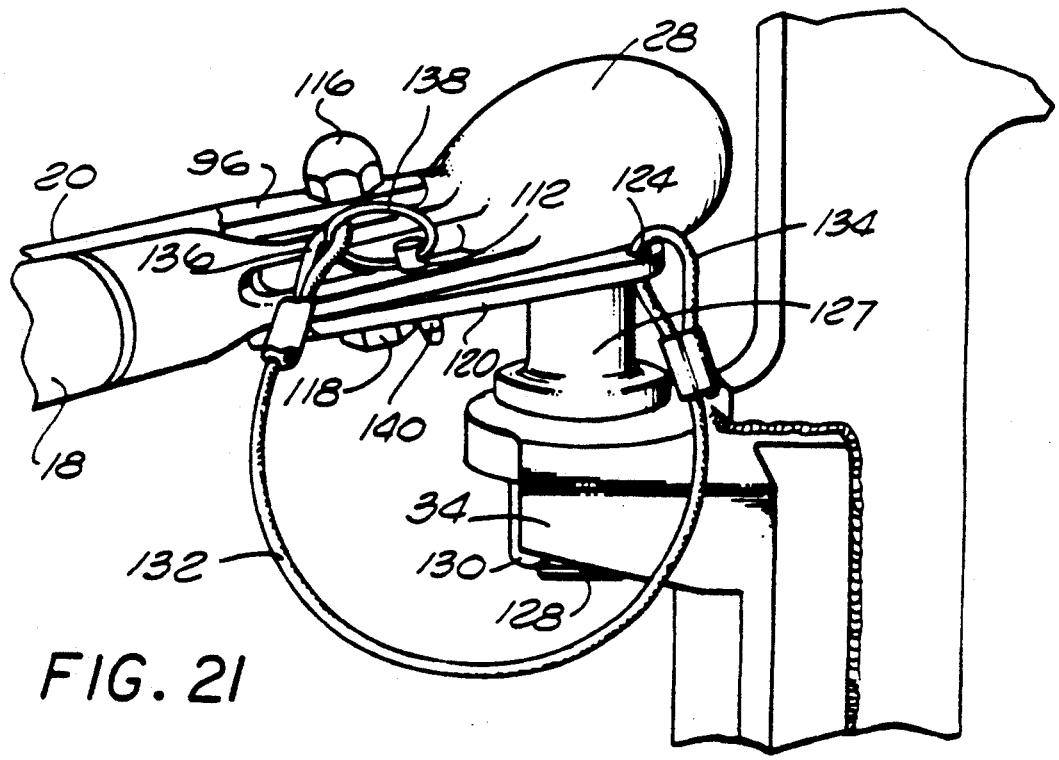
FIG. 21 is another perspective view of the socket member removably engaged to the ball member by the rotatable latch and locking pin.

FIGS. 20, 21 and 22 show how the socket member 28 engages ball member 32 mounted on supporting structure 34 of the tow truck 12. The supporting structure 34 may be of any desirable configuration. The ball member 32 is preferably mounted on a stem member 127 having a threaded end 128 passing through an aperture (not shown) in structure 34 which is secured to structure 34 by a nut 130 screwed onto end 128. Socket cavity 104 engages ball member 32 so that a universal-type point is provided as illustrated in FIG. 22 showing how ball member 32 is free to rotate inside cavity 104 or with respect to socket member 28, or vice versa.

Rotatable latch member 120 preferably has one end of a cable 132 attached to aperture 124 by loop 134. The other end of the cable 132 has a loop 136 attached to a ring 138 connected to a pin 140. The socket member 28 may be secured to the ball member 32 by rotating latch member 120 until aperture 122 therein is aligned with aperture 112 in extension 110 of socket member 28 and then inserting pin 140 through both apertures 112 and 122, preventing latch member 120 from rotating with respect to socket member 28. When in this position, latch member 120 closes off a portion of cavity 104 as best shown in FIG. 20 preventing ball member 32 from disengaging socket cavity 104. However, socket member 28 will still be able to rotate with respect to ball member 32 or act like a universal-type joint when in this locked state. Pin 140 may be of any desirable type and preferably is designed so that the pin 140 will not slip out of apertures 112 and 122 when a vehicle 14 is being towed. For example, a cotter pin may be used, or a pin with a spring-loaded ball at the end thereof, or the like.

A chain 142 may be used in conjunction with a clamp 82 connected to tow bar 18 in the same way that chain 80 is used with a similar clamp 82 as backup support in case socket member 28 slips free of ball member 32 during towing operations. Link 143 at one end of chain 142 would be connected to clamp 82 while the other end of the chain 142 would be connected to support structure 34 or some other part of the undercarriage of the truck 12.

Another embodiment of the tow bar assembly is shown in FIGS. 23 and 24. The ends of the tow bars 18 and 20 are connected to the bumper 48 by eye fasteners 22 and U-bolts 144 attached to the bumper 48 by, for example, nuts 146. However, the U-bolts 144 may be welded or otherwise attached to the bumper.

Figure 30:
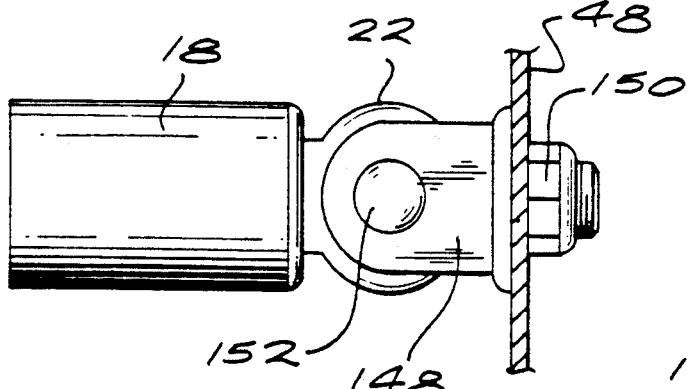
FIG. 30 is an enlarged detailed top plan view of the end of one of the tow bars showing another way of using an eye fastener and clevises to connect the tow bar to a bumper.
Figure 31:
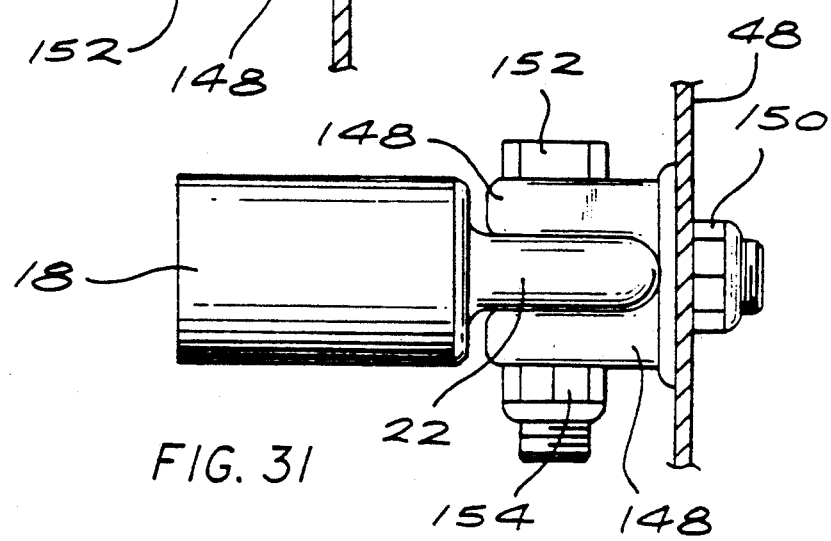
FIG. 31 is an enlarged detailed side elevational view of the end of the tow bar of FIG. 29.

Another means of fastening the ends of the tow bars 18 and 20 to the bumper 48 is shown in FIGS. 30 and 31. In this case, the eye fasteners 22 are removably connected to clevises 148 attached to the bumper 48 by, for example, nuts 150. However, the clevises 148 may be attached to the bumper by any other suitable means such as by welding. Nuts 154 and bolts 152 are used to removably connect the eye fasteners 22 to the clevises 148. This means of removably fastening the ends of the tow bars 18 and 20 to the bumper 48 is particularly advantageous because the tow bars 18 and 20 may be easily removed from the bumper 48 by simply unloosening nuts 154 and bolts 152.

Figure 28:
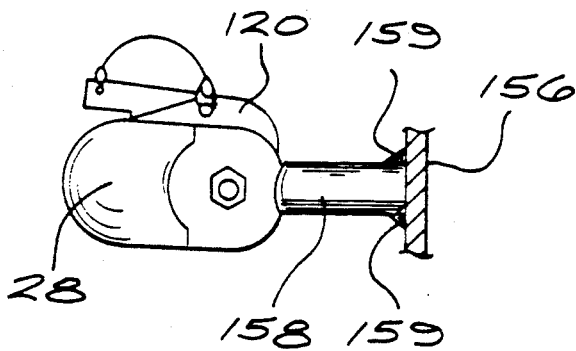
FIG. 28 is a top plan view of another embodiment of the tow bar assembly having only one tow bar which is welded to a bumper.
Figure 29:
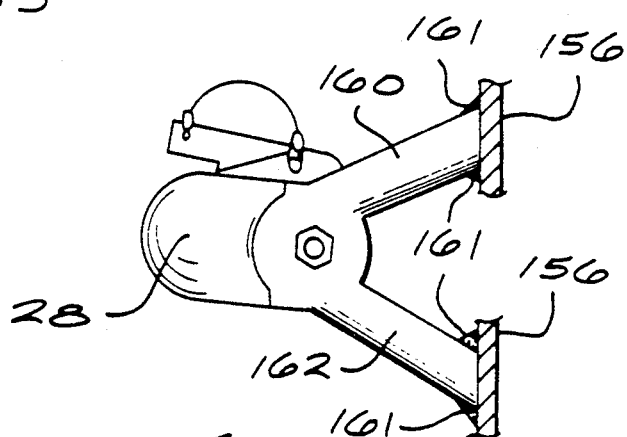
FIG. 29 is a top plan view of another embodiment of the tow bar assembly having two tow bars welded to a bumper.

The tow bar assembly 10 may be used to tow any type of vehicle 14 such as an automobile or a trailer. In the case of a trailer, shortened tow bars 160 and 162 such as shown in FIG. 29 may be permanently attached to a supporting structure 156 on the trailer or automobile by welding 161 (as shown), or by any other suitable means such as nuts and bolts or other fasteners. Longer tow bars 160 and 162 may be used, if desired. Also, only one shortened tow bar 158 as shown in FIG. 28 may be attached to structure 156 by welding 159 as shown in FIG. 28, or by any suitable fastening means. Alternatively, the shortened tow bars 160 and 162 may be used with eye fasteners 22 and U-bolts 144 or clevises 148 as shown in FIGS. 23, 24, 30 and 31. The shortened bars 160 and 162 may also be used with the housing 26 shown in FIG. 22 if desired.

The tow bars 18, 20, 158, 160 and 162 may be rigidly attached to or integrally formed with socket member 28 (see FIG. 25 for an example of integrally formed parts). In such a case, tow bars 18 and 20, or 160 and 162, would not be free to move with respect to each other.

Figure 26:
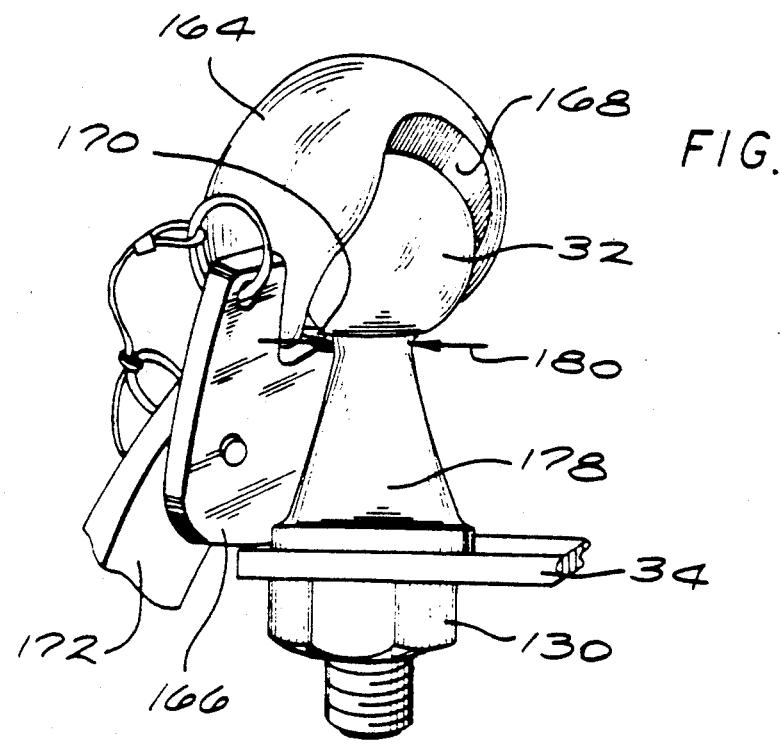
FIG. 26 is a perspective view showing the socket member removably engaged to the ball member by the rotating latch member and how the depressions in the latch member facilitate rotation of the socket member with respect to the ball member.
Figure 27:
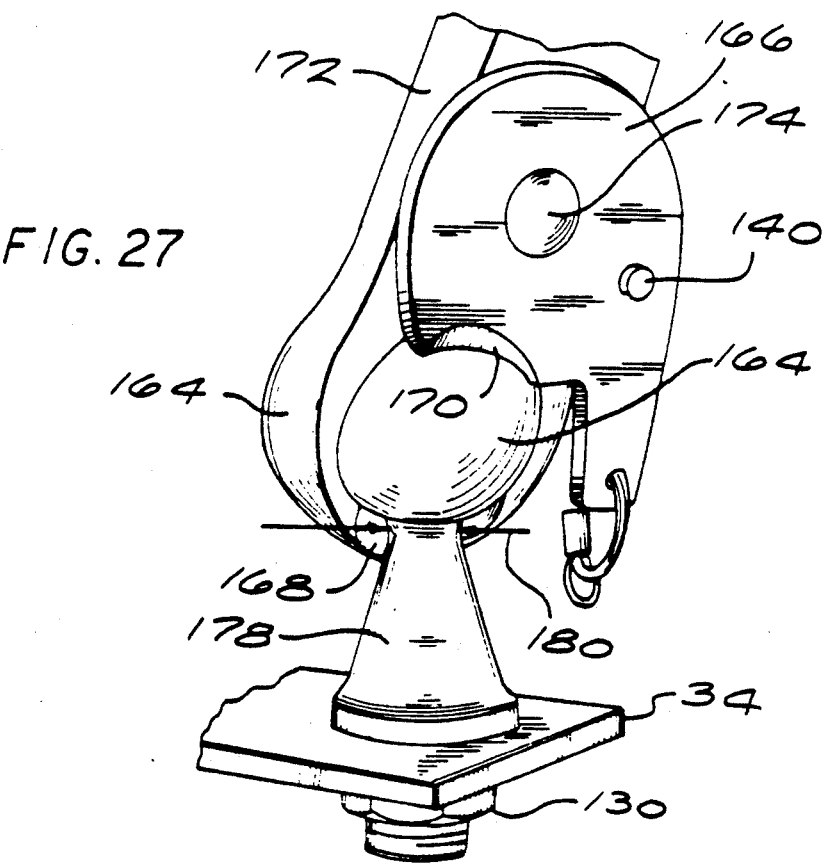
FIG. 27 is another perspective view showing how the depressions in the socket member facilitate rotation of the socket member with respect to the ball member.

FIGS. 25 through 27 show an improved version of the universal-type joint featuring a socket member 164 and a rotating latch member 166 having arcuate-shaped depressions or cutaway surfaces 168 and 170, respectively, therein. Note that tow bar 172 shown in FIG. 25 is integrally formed with socket member 164, but socket member 28, tow bars 18 and 20, and latch member 120 shown in FIG. 22 may also be used with cutaway surfaces 168 and 170 if desired. The rotating latch member 166 is rotatably engaged to tow bar 172 by nut 176 and bolt 174, or by any other suitable means.

Stem member 178 attached to ball member 32 has a minimum diameter 180 adjacent where it attaches to member 32. As best illustrated in FIG. 25, cutaway surfaces 168 and 170 facilitate rotation of the socket member 164 with respect to ball member 32 as diameter 180 of member 32 fits into or engages cutaway surfaces 168 and 170. Rotation will depend on the dimensions of diameter 180 and the angle 182 at which cutaway surfaces 168 and 170 are cut, machined or formed with respect to a vertical line as shown in FIG. 25. Using angle 184 that the centerline of stem member 184 makes with a vertical line as a reference, angle 184 will be approximately 45 degrees when angle 182 is approximately 45 degrees and diameter 180 is approximately 1 inch. As another example, angle 184 will be approximately 60 degrees when diameter 180 of member 178 is approximately ¾ inch and angle 182 is approximately 60 degrees. However, angle 184 may be varied as desired by changing the dimension of diameter 180 and angle 182. Angle 184 preferably varies in the range of from about 30 degrees to about 70 degrees. Angle 182 also preferably varies in the range of from about 30 degrees to about 70 degrees. Diameter 180 preferably varies in the range of from about ½ inch to about 1 inch.

The angles 182 of the cutaway surfaces 168 and 170 may be different, if desired, and cutaway surfaces may be used in only one of members 164 and 166, or in both members 164 and 166. The cutaway surfaces 168 and 170 are preferably arcuate-shaped as shown in FIGS. 26 and 27. However, any desirable shape may be used for surfaces 168 and 170.

As seen from the above discussion, cutaway surfaces 168 and 170 allow the socket member 164 to rotate through increased angles. As such, the universal-type joint shown in FIGS. 25-27 allows vehicle 14 to be towed over extremely uneven terrain. The cutaway surfaces 168 and 170 may also be used with the tow bar assembly 10 shown in FIGS. 1-22 if desired.

The above description discloses the preferred embodiments of the present invention. However, persons of ordinary skill in the art are capable of numerous modifications once taught these principles such as, by way of example and not limitation, the tow bars 18 and 20 may be made out of solid members rather than steel tubing, the U-bolts 24 may be welded rather than secured by nuts 46 to the bumper housings 26, springs 58 may be located inside cavities 45 rather than on top of the bumper housings 26, and a spring-loaded joint rather than a bolt 116 and nut 118 may be used to connect the socket member 28 to clevis member 30 and rotatable latch 120.

In addition, tow bars 18 and 20 may be unbolted from the cylindrical members 100 and 102 connected to the clevis member 30 and socket member 28, respectively, and from cylindrical members 92 connected to the eye fasteners 22 and replaced by other tow bars. For example, tow bars 18 and 20 that are bent rather than straight may be used for the tow bar assembly 10. The bars 18 and 20 may be bent or slanted downward toward the ends which engage the housing 26 starting near the middle of the bars and continuing for a certain distance until the slanted bars become straight or horizontal again, the horizontal portions of the bars extending to where the eye fasteners 22 attach to the bars. As such, horizontal lengths of the bars 18 and 20 at both ends of the bars are at different levels connected together by downward slanted lengths or portions of the bars so that the horizontal lengths near the socket member 28 are at a higher level or elevation than the horizontal lengths connected to the eye fasteners 22.

When the tow bars 18 and 20 are bent as described above, the horizontal lengths of the bars connected to the eye fasteners 22 may be conveniently positioned under a disabled vehicle 14 when housings 26 are attached to the undercarriage of the vehicle. Note that the pivotable engagement of the eye fasteners 22 to the U-bolts 24 facilitate attaching housings 26 to the undercarriage of the vehicle 14. Also, downward bent tow bars 18 and 20 make it easier to tow a disabled vehicle 14 located below the tow truck 12. Such downward bent tow bars 18 and 20 may also be used when the housings 26 are attached to the bumper 48 of a vehicle 14. Accordingly, it will be understood by those skilled in the art that changes in form and details may be made to the above-described embodiments without departing from the spirit and scope of the invention.

I claim:

1. A tow bar assembly for use with a tow vehicle having an undercarriage supporting structure used to tow a disabled vehicle, comprising:
    two elongated tow bars, each of said bars having first and second ends, said first ends being removably attached to said disabled vehicle;
    a ball member attached to a stem member and mounted on said supporting structure of said tow truck;
    socket means engaged to said second ends of said tow bars for removably and rotatably engaging said tow bar assembly to said ball member on said supporting structure of said tow vehicle; and
    rotating latch means rotatably and directly engaged to said socket means for removably securing said socket means to said ball member on said supporting structure, said rotating latch means including a single integral member rotatably and directly engaged to said socket means and adapted to rotate so that said integral member will come into contact with said ball member in order to removably secure said socket means to said ball member, said socket means and said rotating latch means having means for increasing rotation of said socket means with respect to said ball member and for allowing said socket means to rotate with respect to said ball member until said stem member comes into contact with said means for increasing rotation of said socket means and said rotating latch means, said means for increasing rotation comprising depressions in said socket means and said rotating latch means.

2. The tow bar assembly of claim 1 wherein said depressions are arcuate-shaped depressions.

3. The tow bar assembly of claim 2 wherein said depressions are formed at an angle, said angle being measured from a vertical line when said tow bars are oriented horizontally.

4. The tow bar assembly of claim 3 wherein said angle is in the range of from about 30 degrees to about 70 degrees.

5. The tow bar assembly of claim 1 wherein said means for increasing rotating allows said socket means to rotate through an angle with respect to said ball member from a first position where said tow bars are oriented horizontally to a second position where said tow bars have rotated from said first position, said angle being in the range of from about 30 degrees to about 70 degrees.

6. A tow bar assembly for use with a tow vehicle having an undercarriage supporting structure used to tow a vehicle such as an automobile or trailer, comprising:
- two elongated tow bars, each of said bars having first and second ends, said first ends being attached to said vehicle;
- a ball member attached to a stem member and mounted on said supporting structure of said tow truck;
- socket means engaged to said second ends of said tow bars for removably and rotatably engaging said tow bar assembly to said ball member on said supporting structure of said tow vehicle; and
- rotating latch means rotatably and directly engaged to said socket means for removably securing said socket means to said ball member on said supporting structure, said rotating latch means including a single integral member rotatably and directly engaged to said socket means and adapted to rotate so that said integral member will come into contact with said ball member in order to removably secure said socket means to said ball member, said socket means and said rotating latch means having means for increasing rotation of said socket means with respect to said ball member and for allowing said socket means to rotate with respect to said ball member until said stem member comes into contact with said means for increasing rotation of said socket means and said rotating latch means, said means for increasing rotation comprising depressions in sais socket means and said rotating latch means.

7. The tow bar assembly of claim 6 wherein said first ends of said tow bars are removably attached to said vehicle.

8. The tow bar assembly of claim 6 wherein said depressions are arcuate-shaped depressions.

9. The tow bar assembly of claim 8 wherein said depressions are formed at an angle, said angle being measured from a vertical line when said tow bars are oriented horizontally.

10. A tow bar assembly for use with a tow vehicle having an undercarriage supporting structure used to tow a vehicle such as an automobile or trailer, comprising:
- a tow bar having first and second ends, said first end being attached to said vehicle;
- a ball member attached to a stem member and mounted on said supporting structure of said tow truck;
- socket means engaged to said second end of said tow bar for removably and rotatably engaging said tow bar assembly to said ball member on said supporting structure of said tow vehicle; and
- rotating latch means rotatably and directly engaged to said socket means for removably securing said socket means to said ball member on said supporting structure, said rotating latch means including a single integral member rotatably and directly engaged to said socket means and adapted to rotate so that said integral member will come into contact with said ball member in order to removably secure said socket means to said ball member, said socket means and said rotating latch means having means for increasing rotation of said socket means with respect to said ball member and for allowing said socket means to rotate with respect to said ball member until said stem member comes into contact with said means for increasing rotation of said socket means and said rotating latch means, said means for increasing rotation comprising depressions in said socket.means and said rotating latch means.

11. The tow bar assembly of claim 10 wherein said first end of said tow bar is removably attached to said vehicle.

12. The tow bar assembly of claim 10 wherein said depressions are arcuate-shaped depressions.

13. The tow bar assembly of claim 12 wherein said depressions are formed at an angle, said angle being measured from a vertical line when said tow bars are oriented horizontally.

* * * * *